(12) United States Patent
Chelin et al.

(10) Patent No.: US 8,918,977 B2
(45) Date of Patent: Dec. 30, 2014

(54) PROCESS FOR THE DESTRUCTION OF A BLIND FASTENER AND DEVICE FOR ITS IMPLEMENTATION

(71) Applicant: Airbus Operations SAS, Toulouse (FR)

(72) Inventors: Frédéric Chelin, Encausse (FR); Jacques LaLane, Saint Orens de Gameville (FR)

(73) Assignee: Airbus Operations S.A.S., Toulouse (FR)

( * ) Notice: Subject to any disclaimer, the term of this patent is extended or adjusted under 35 U.S.C. 154(b) by 240 days.

(21) Appl. No.: 13/644,803

(22) Filed: Oct. 4, 2012

(65) Prior Publication Data

US 2013/0081248 A1 Apr. 4, 2013

(30) Foreign Application Priority Data

Oct. 4, 2011 (FR) .................................... 11 58940

(51) Int. Cl.
*B23P 19/02* (2006.01)
*B23P 19/00* (2006.01)
(Continued)

(52) U.S. Cl.
CPC ................ *B21J 15/50* (2013.01); *B23B 47/284* (2013.01)
USPC ........ 29/426.4; 29/402.06; 29/426.5; 29/244; 29/270; 29/275; 408/84

(58) Field of Classification Search
CPC .......... B21J 15/50; B25B 27/00; B25B 27/18; B25B 27/02; B25B 27/30; B23P 19/025
USPC ............... 29/426.4, 426.1, 426.5, 283, 283.5, 29/566, 566.1, 426.6, 244, 270, 275, 29/402.06, 402.19; 408/110–112, 84
See application file for complete search history.

(56) References Cited

U.S. PATENT DOCUMENTS 1,023,002 A * 4/1912 Bennett .......................... 408/112
2,296,087 A * 9/1942 Burns, Jr. ......................... 408/81
(Continued)

FOREIGN PATENT DOCUMENTS

DE 20010941 * 9/2000 ............... B21J 15/50
DE 20010941 U1 9/2000
(Continued)

OTHER PUBLICATIONS

EPO machine translation of DE20010941, Sep. 2000; Thiele Hartmut, pp. 1-3.*
(Continued)

*Primary Examiner* — David Bryant
*Assistant Examiner* — Bayan Salone
(74) *Attorney, Agent, or Firm* — Ingrassia Fisher & Lorenz, P.C.

(57) ABSTRACT

A method is provided for destroying a blind fastener joining at least two parts. The blind fastener includes, but is not limited to a body situated in the holes provided in the joined parts, with a head at each end thereof, and portions of which protrude above the level of the holes. The method also includes, but is not limited to withdrawing the accessible head of the fastener, and creating a hole that passes through the fastener. An insertion device is configured to restrain the remainder of the fastener in the hole, which has an elongated body having a diameter smaller than or equal to that of the hole and an expandable head at one end thereof The insertion device for restraining the remainder of the fastener being immobilised or capable of only limited movement relative to the joined parts, and expelling the remainder of the fastener from the holes.

6 Claims, 4 Drawing Sheets

(51) Int. Cl.
- *B23P 6/00* (2006.01)
- *B23P 19/04* (2006.01)
- *B23Q 1/00* (2006.01)
- *B23Q 3/00* (2006.01)
- *B23B 49/00* (2006.01)
- *B21J 15/50* (2006.01)
- *B23B 47/28* (2006.01)

(56) References Cited

U.S. PATENT DOCUMENTS

| | | | |
|---|---|---|---|
| 2,979,243 A * | 4/1961 | Moeckel | 225/97 |
| 3,576,064 A * | 4/1971 | Brackin | 29/254 |
| 3,620,635 A * | 11/1971 | DalBianco et al. | 408/84 |
| 5,125,144 A * | 6/1992 | Clark | 29/240 |
| 5,127,145 A * | 7/1992 | Ross | 29/402.02 |
| 5,228,811 A * | 7/1993 | Potter | 408/84 |
| 5,259,104 A * | 11/1993 | Givler | 29/426.5 |
| 5,318,390 A * | 6/1994 | DalBianco | 408/84 |
| 5,388,933 A * | 2/1995 | Dunbar | 408/72 B |
| 5,649,791 A * | 7/1997 | Connolly | 408/1 R |
| 5,743,683 A | 4/1998 | Skaggs | 408/97 |
| 5,820,314 A * | 10/1998 | Dunbar | 408/72 B |
| 5,893,684 A * | 4/1999 | Skaggs | 408/1 R |
| 6,203,253 B1 * | 3/2001 | Perrault | 408/84 |
| 6,330,738 B1 * | 12/2001 | Yoshikawa et al. | 29/426.4 |
| 6,332,259 B1 * | 12/2001 | Yoshikawa et al. | 29/407.01 |
| 6,435,782 B1 * | 8/2002 | Hillhouse | 408/72 B |
| 6,581,259 B1 * | 6/2003 | Yoshikawa et al. | 29/33 R |
| 7,028,380 B2 * | 4/2006 | Donovan et al. | 29/402.01 |
| 7,555,820 B2 * | 7/2009 | McEldowney et al. | 29/426.4 |
| 7,784,163 B2 * | 8/2010 | Suarez et al. | 29/282 |
| 8,281,469 B2 * | 10/2012 | King | 29/235 |
| 8,387,226 B2 * | 3/2013 | Weigel et al. | 29/426.4 |
| 8,661,637 B2 * | 3/2014 | King | 29/235 |
| 2011/0000064 A1 * | 1/2011 | Weigel et al. | 29/426.4 |
| 2013/0004263 A1 * | 1/2013 | Palmisano | 411/501 |

FOREIGN PATENT DOCUMENTS

| | | | | |
|---|---|---|---|---|
| DE | 202008007342 | * | 5/2008 | B21J 15/50 |
| DE | 202008007342 U1 | | 8/2008 | |
| EP | 1810790 A1 | | 7/2007 | |

OTHER PUBLICATIONS

EPO machine translation of DE202008007342, May 2008; Klann Spezial Werkzeugbau, pp. 1-10.*

French Republic National Institute of Industrial Property, Preliminary Search Report dated Jun. 26, 2012 for French Patent Application No. 1158940.

* cited by examiner

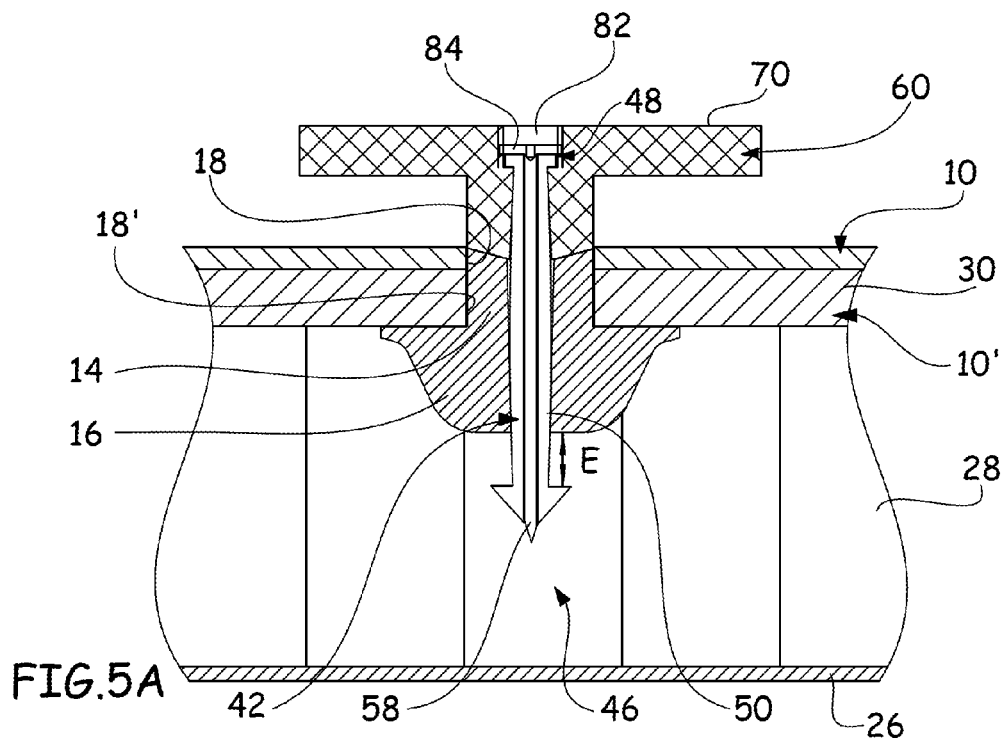
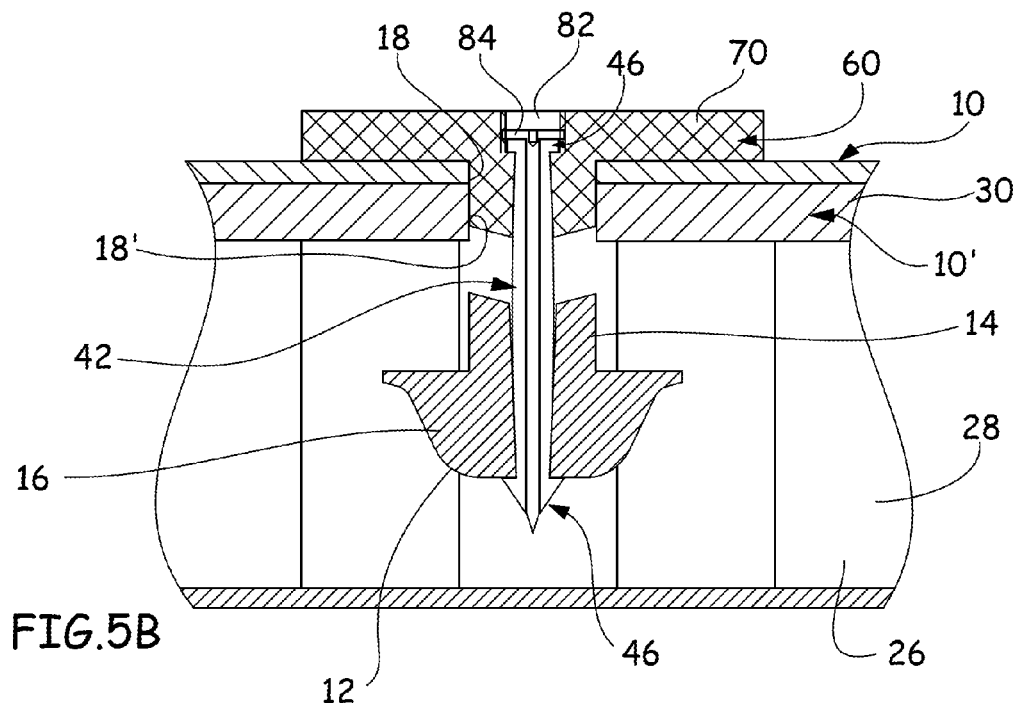

PROCESS FOR THE DESTRUCTION OF A BLIND FASTENER AND DEVICE FOR ITS IMPLEMENTATION

CROSS-REFERENCE TO RELATED APPLICATIONS

This application claims priority to French Patent Application No. 11 58940, filed Oct. 4, 2011, which is incorporated herein by reference in its entirety.

TECHNICAL FIELD

The technical field relates to a method for destroying a blind fastener such as a blind rivet and to a device for carrying out the method.

BACKGROUND

As is shown in FIG. 1, two elements 10, 10' positioned flush with one another are assembled with at least one blind fastener in the form of a rivet 12 comprising a cylindrical body 14 having two heads 16, 16', one at either end. For each rivet, the first element to be assembled 10 is furnished with a hole 18 located in the continuation of a hole 18' created in the first element to be assembled 10', in which cylindrical body 14 of the rivet is seated. In addition, the first element to be assembled 10 has a bearing surface 20 against which one of the heads 16 of the rivet may be flattened, and the second element to be assembled 10' has a bearing surface 20' against which the other head 16' of the rivet is flattened.

When it is put in place, the rivet is deformed particularly in terms of its heads 16 and 16', and cylindrical body 14 tends to expand to create a tight, adjusted fit between said cylindrical body 14 and holes 18, 18'. Accordingly, after the rivet has been put in place, elements 10 and 10' are held together by heads 16, 16' of the rivet and also by the adjusted tight fit between cylindrical body 14 of the rivet and holes 18, 18'.

As described in document EP-898.063, blind fasteners may be used to create a join between a flange plate 22 and an acoustic treatment panel 24 provided on the air intake of an aircraft engine nacelle. An acoustic treatment panel 24 comprises in known manner a sound damping layer 26 that is in contact with the aerodynamic airflows, a cellular structure 28 and a reflective layer 30. In this application, rivet 12 provides the join between reflective layer 30 and a flange 22, and one of the heads 16' of the rivet is buried in cellular structure 28.

When it becomes necessary to remove panel 24 and flange 22, rivet 12 has to be destroyed. For this purpose a drill equipped with a bit 32 having a diameter essentially equal to that of holes 18, 18' is used to partly destroy one of the heads 16 so that the body 14 of the rivet can be separated. When the bit reaches a certain depth, the ring-shaped remainder of head 16 separated from body 14. However, it is necessary to continue drilling and apply a certain pressure to the remainder of the rivet in order to detach it given the tight adjusted fitting between the body 14 of the rivet and holes 18, 18'. After a certain depth has been passed, the pressure applied by the operator causes a sudden break in the attachment between the rivet body and the holes in the parts to be joined.

When this operation is carried out on several rivets in succession, it can happen that the operator is carried forward by the impetus of his own efforts and does not restrain the drill, with the result that rivet 12 may pass through the cellular structure and damage the acoustic treatment panel by denting it as shown in FIG. 2. If this dent is too pronounced, it then becomes necessary to repair panel 24, or even replace it.

Therefore, in order to limit the risk of damaging the panel the disassembly operation must be carried out with extreme care, which tends to increase the time required for the operation and extend the period for which the aircraft is out of service.

Accordingly, at least one purpose is to alleviate the drawbacks of the prior art by suggesting a method for destroying a blind fastener that limits the risk of damaging the elements that are joined by said fastener. In addition, other purposes, desirable features and characteristics will become apparent from the subsequent summary and detailed description, and the appended claims, taken in conjunction with the accompanying drawings and this background.

SUMMARY

To this end, a method is for destroying a blind fastener that joins two parts. The blind fastener comprising a body situated in the holes provided in the joined parts, and a head at each end thereof, portions of which protrude above the level of the holes. The method comprising the step of withdrawing the accessible head of the fastener and being characterized in that it includes the subsequent step of creating a hole through the fastener, an inserting device for restraining the remainder of the fastener, having an elongated body having a diameter smaller than or equal to that of the hole and an expandable head at one end thereof The inserting device for restraining the remainder of the fastener being immobilised or capable of only limited movement relative to the joined parts, and expelling the remainder of the fastener from the holes.

BRIEF DESCRIPTION OF THE DRAWINGS

Other features and advantages will be evident from the following description of the invention, this description being provided solely for exemplary purposes, and with reference to the accompanying drawing, in which:

FIG. 5A and FIG. 5B are cross sections showing another variant of a device for implementing the same steps as the device of FIG. 4A and FIG. 4B;

DETAILED DESCRIPTION

Figures 1, 2:
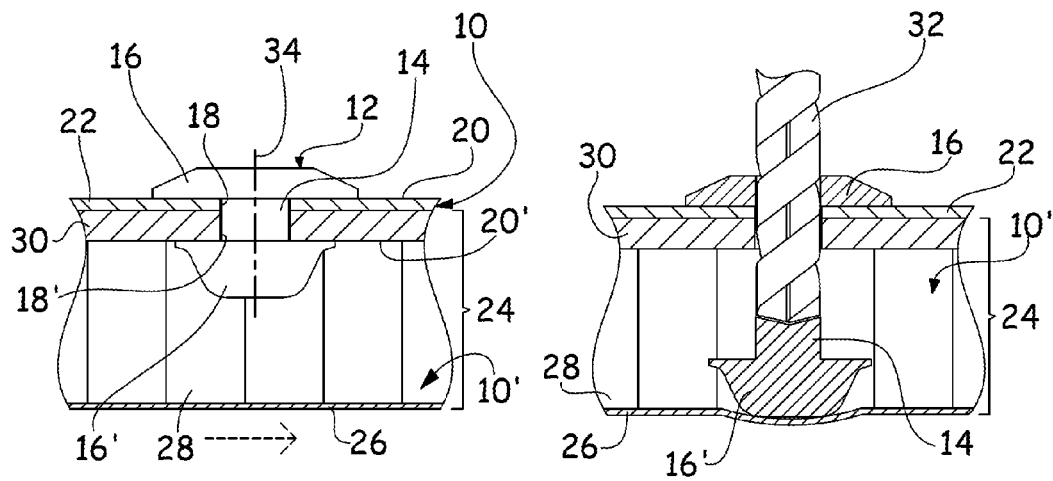
FIG. 1 is a cross sectional view through a blind fastener.
FIG. 2 is a cross section showing the operating practice for destroying said fastener according to the prior art.

The following detailed description of the invention is merely exemplary in nature and is not intended to limit application and uses. Furthermore, there is no intention to be bound by any theory presented in the preceding background or summary or the following The embodiments will be described as it applies to a blind fastener 12 creating a join between at least two parts 10 and 10', for example a flange plate and an acoustic treatment panel, as shown in FIG. 1. For the purposes of the embodiment, a blind fastener 12 is understood to mean any joining element comprising a body 14 that is situated in holes 18, 18', which are provided in the joined parts 10 and 10', and having heads 16, 16' at each end thereof, with sections that protrude above the level of holes 18, 18', thus being capable of holding parts 10, 10' together. The fastener is described as blind because one of its heads 16' is not accessible. For the purposes of the rest of this description, the term longitudinal direction is understood to mean the direction parallel to axis 34 of the fastener body 14.

In the various figures, blind fastener 12 creates a joint between an element and an acoustic treatment panel 24 that includes a sound damping layer 26 in contact with the aerodynamic airflows, a cellular structure 28 and a reflective layer 30. In this application, one of the heads 16' of blind fastener 12 is fitted at the level of cellular structure 28 and is flattened against reflective layer 30. Of course, the embodiments are not limited to this application and may be implemented to destroy any fastener with tight adjusted fitting between body 14 and holes 18, 18' when it is necessary to restrain the remainder of the fastener to prevent it from damaging an adjacent element, such as a sound damping layer on an acoustic treatment panel, for example.

Figure 3A:
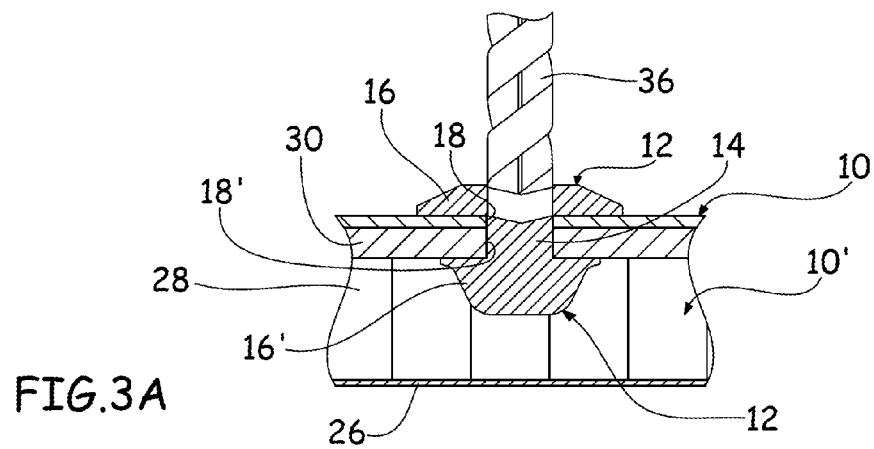
FIG. 3A and FIG. 3B are cross sections showing the first steps of the method for destroying a blind fastener.

The first step removes the accessible head 16 of the fastener, particularly by separating it from the rest of the fastener, as shown in FIG. 3A. To this end, as in the prior art, a drill bit 36 having a diameter essentially equal to that of body 14 of the fastener may be used. However, unlike the prior art, the bit is only used to separate the head from the rest of the fastener, not to extract the remainder of the rivet from the holes as well. Consequently, the operator stops drilling as soon as head 16 is separated from body 14. In a variation, it is possible to use a tool having a diameter essentially equal to that of head 16 in order to destroy it completely by drilling.

Figure 3B:
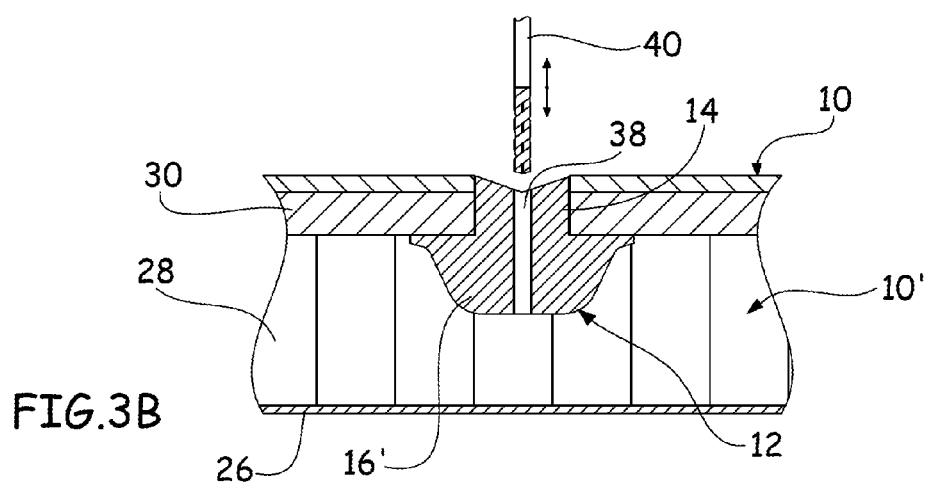

After the accessible head 16 has been removed, a hole 38 is created through the fastener, as shown in FIG. 3B. Hole 38 is advantageously coaxial with axis 34 of the fastener. This hole 38 has a diameter that is smaller than or equal to half of the diameter of body 14 of the fastener. By way of example, this hole has a diameter of about 4 mm for an 8 mm fastener.

According to one embodiment, a second drill bit 40 with a smaller diameter than that of drill bit 36 is used to create hole 38. In all cases, the diameter of hole 38 is such that the force that needs to be applied by bit 40 on the remainder of the fastener is less than that required to expel the remainder of the fastener from holes 18, 18'.

Then, inserting device 42 for holding the remainder of the fastener in place is inserted in hole 38. This device 42 comprises an elongated body 44 having a diameter smaller than or equal to that of hole 38 and an expandable head 46 at a first end thereof and a retaining head 48 at the other end thereof. Expandable head 46 may be in one of two states, a first stated being expanded, in which it has a section that does not allow it to pass through hole 38, and a second state, called retracted, in which it has a section that allows it to pass through hole 38.

According to one embodiment, device 42 for holding the remainder of the fastener in place is in the shape of a pin, particularly used for prepositioning parts when they are being assembled. Accordingly, it comprises a hollow needle 50 with a longitudinal passage 52, a flange 54 at a first end that serves as a retaining head 48 and at least one longitudinal slot at the other end which divides the needle into two semi-cylindrical halves, each of which has a barbed end 56 serving as expandable head 46. In addition, device 42 comprises a rod 58 that is capable of being inserted into hollow needle 50, the diameter of passage 52 being narrower at the barbed ends 56 so that when rod 58 is not inserted in needle 50 directly above barbed ends 56, these ends are constricted and expandable head 46 is in the retracted state, whereas when rod 58 is inserted in the needle directly above barbed ends 56, these ends are spread outwards and expandable head 46 is in the expanded state.

Needle 50 is made from an elastic or shape memory material to ensure that expandable head 46 returns to the retracted state when rod 58 is withdrawn from passage 52.

According to an embodiment, device 42 for holding the remainder of the fastener in place are immobilised or have limited movement relative to the parts 10, 10' that are joined by fastener 12. There is preferably some free play between head 16' of the fastener and expandable head 46 after device 42 has been put in place, to enable relative movement between the remainder of the fastener and device 42.

After device 42 has been put in place to hold the remainder of the fastener in position, the remainder of the fastener is expelled from holes 18, 18' by any suitable device, method, or apparatus. The term expelled is understood to mean that the remainder of the fastener is not pulled out, but pushed.

Unlike the prior art, the remainder of the fastener does not damage an adjacent element, such as a sound damping layer, because it is restrained by expandable head 46 of device 42. Besides device 42, the device for expelling the remainder of the fastener comprises a punch 60 which, in the manner of a pin driver, serves to drive the remainder of the fastener out of holes 18, 18'.

According to one embodiment, punch 60 is made up of two tiered sections, a circular lower section 64 having a diameter smaller than or equal to that of holes 18, 18' so that it is able to pass through them and a lower face 66 that is designed to contact the remainder of the fastener, an upper section 68, which protrudes above the level of holes 18, 18' and has an upper face 70, which the operator may strike using a tool such as a hammer or mallet. Lower face 66 is conformed to complement the shape of the remainder of the fastener. Accordingly, lower face 66 has a conical shape, like drill bit 36. The lower face of upper section 68 preferably has a coating 72 of a material designed to attenuate impacts and reduce the risks of damaging joined part 10. According to one embodiment, coating 72 is made from an elastomer.

Figure 4A:
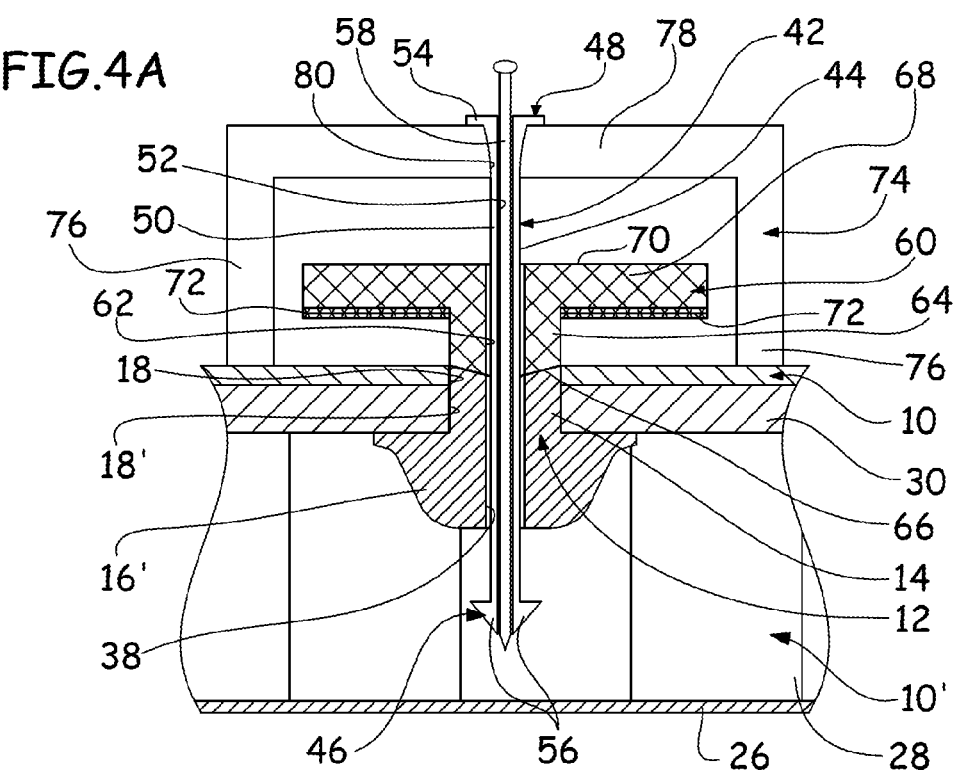
FIG. 4A and FIG. 4B are cross sections showing a first variant of a device for implementing the following steps of the method for destroying a blind fastener.
Figure 4B:
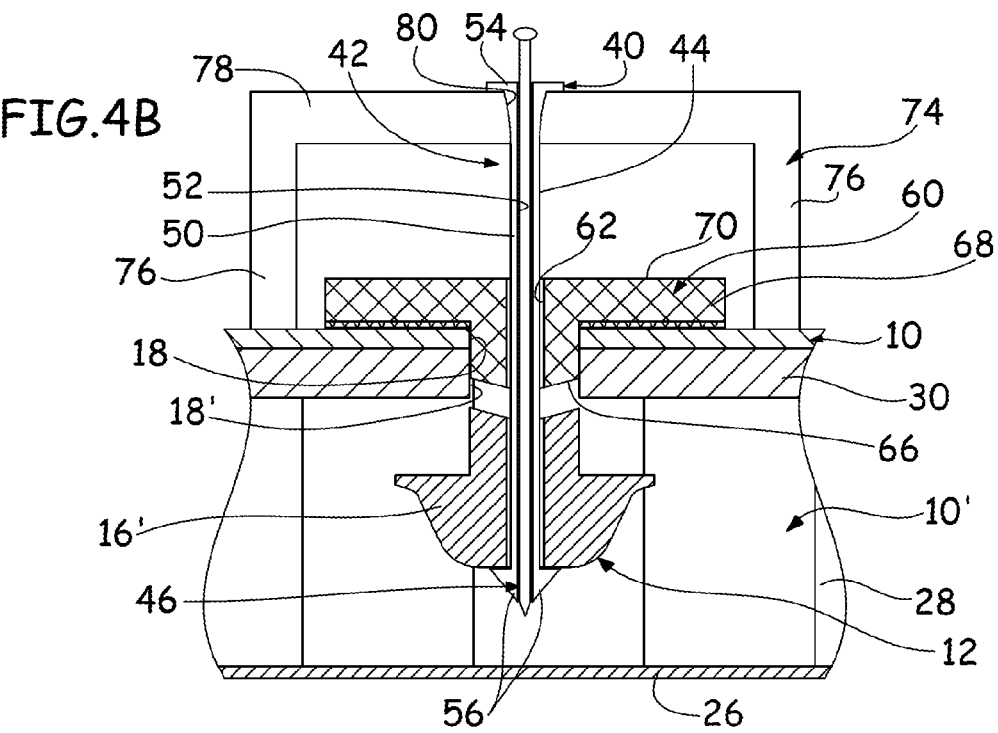

According to another embodiment, as shown in FIG. 4A and FIG. 4B, punch 60 is slidable relative to means 42 and comprises a longitudinal hole 62 in which device 42 is able to slide to hold the remainder of the fastener in place. Additionally, besides device 42 and punch 60, the device for expelling the remainder of the fastener comprises a bearing element 74 that provides support for device 42 for holding the remainder of the fastener in place, as is shown in FIG. 4A, FIG. 4B, FIG. 6A and FIG. 6B.

According to an embodiment shown in FIG. 4A and FIG. 4B, bearing element 74 comprises legs 76 that are designed to be braced against a reference element, and particularly joined parts 10, 10', and a central element 78 with an orifice 80 whose diameter is essentially equal to that of needle 50, retaining head 48 lying flush with the upper face of central element 78. Legs 76 and central element 78 of bearing element 74 are shaped in such as to allow the upper face 70 of punch 60 to be struck with tool. The device for expelling the remainder of the fastener advantageously comprises means for adjusting the position of needle 50 relative to bearing element 74 and therewith free play E between head 16' of the remainder of the rivet and expandable head 46.

According to one embodiment, it is possible to interpose one or more washers of varying thicknesses between retaining head 48 and central element 78. In a variant, it would be possible to provide a screw thread on the outer surface of needle 50 that is able to cooperate with a tapping arrangement provided at orifice 80 of the bearing element. At all events, other technical solutions would be conceivable for ensuring that needle 50 is positioned correctly relative to bearing element 74.

It is relatively simple to use this embodiment. After withdrawing head 16 of the fastener and drilling hole 38, the user positions bearing element 74 and inserts needle 50 in hole 38. The user then inserts rod 58 in needle 50 in such manner as to ensure that expandable head 46 is in the expanded state. If necessary, the user adjusts the position of needle 50 relative to bearing element 74 so as to create a free play E equal to or greater than the sum of the heights of holes 18, 18'. The outer surface of needle 50 may be graduated make this positioning easier. Then, the user strikes upper face 70 of punch 60, with a tool to expel the remainder of the fastener.

In this action, punch 60 expels the remainder of the fastener, which is held in place by expandable head 46 as shown in FIG. 4B. Then, the user withdraws rod 58. Expandable head 46 retracts so that it is able to be withdrawn from hole 38 and releases needle 50 from the remainder of the fastener. After this, the hole left by the fastener is plugged with expanding foam which hardens so as to strengthen to panel and immobilise the remainder of the fastener in the cellular structure in order to minimise vibrations.

Figure 6A:
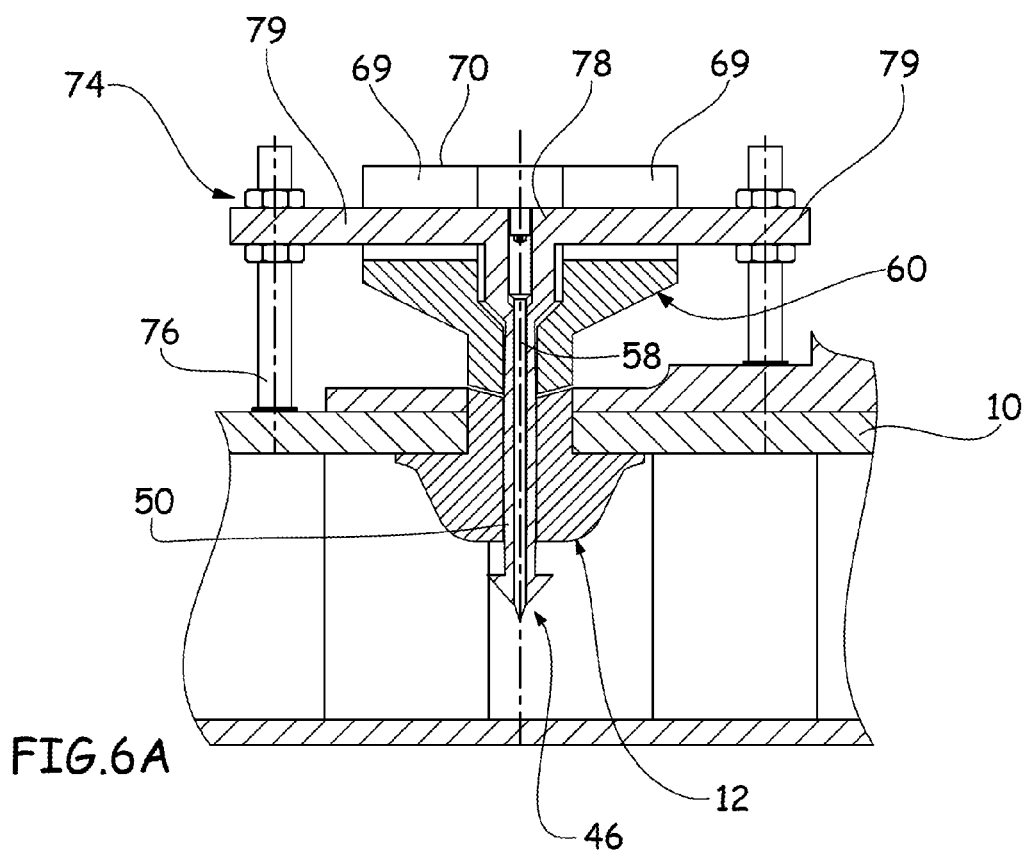
FIG. 6A is a cross section showing another variant of a device for implementing the same steps as the device of FIG. 4A and FIG. 4B.
Figure 6B:
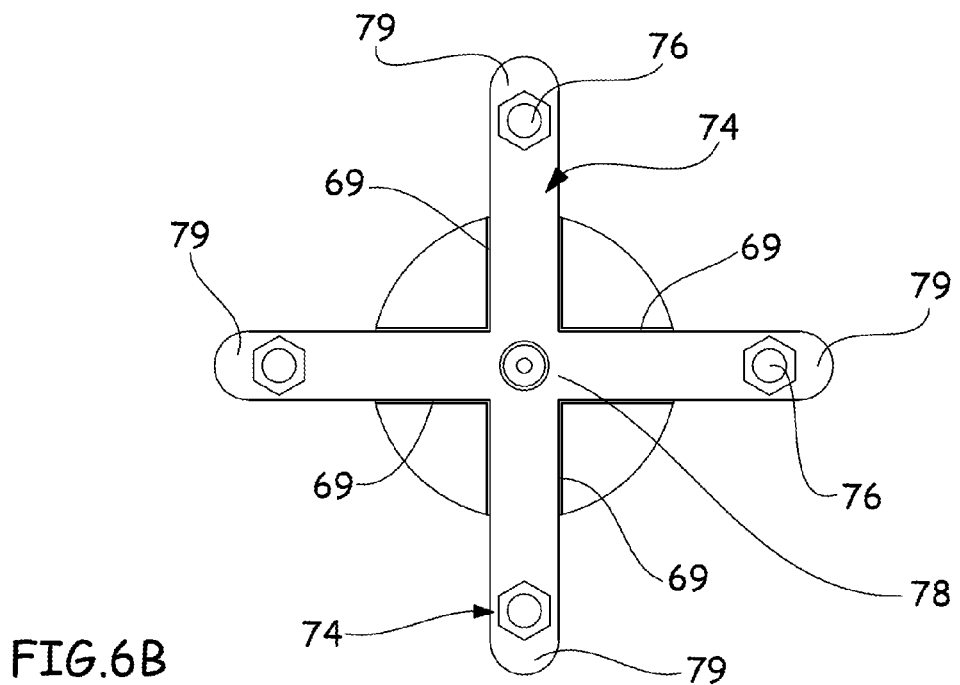
FIG. 6B is a top view of the device of FIG. 6A.

According to another, similar embodiment as shown in FIG. 6A and FIG. 6B, needle 50 and central element 78 of bearing element 74 are produced from a single part. The central element comprises at least two arms 79, preferably three, each end of which is furnished with legs 76 that are movable relative to arms 79 to enable the height of bearing element 74 and free play E to be adjusted. Each leg 76 is in the form of a rod, at least part of which is threaded. It is thus possible to adjust the position of each leg independently of the others. This configuration enables the bearing element to be adapted for non-coplanar surfaces. The end of each leg 76 that is in contact with the joined parts is advantageously furnished with a shock absorbing element in order to avoid marking them.

According to this embodiment, punch 60 comprises an upper section 68 with grooves 69, each of which accommodates an arm 79. The height of punch 60 and that of grooves 69 are such that arms 79 are always accommodated in grooves 69 and the upper face 70 of punch 60 is always higher than bearing element 74 even when the punch is in its lowest position with respect to the bearing element. With this configuration, the upper face of the punch is always readily accessible. The operation of the device illustrated in FIG. 6A and FIG. 6B is essentially the same as that shown in FIG. 4A and FIG. 4B.

According to another variant of the invention, shown in FIG. 5A and FIG. 5B, the device for expelling the remainder of the fastener includes a device for creating a connection between punch 60 and the device 42 for holding the remainder of the fastener in place. Thus, device 42 is connected to punch 60 in such manner as to be immobilised relative to said punch 60. The connection between device 42 and the punch advantageously enables these two elements to be repositioned relative to one another, thus also adjusting free play E between head 16' of the remainder of the rivet and expandable head 46.

According to one embodiment, longitudinal hole 62 in punch 60 includes a counterbore 82 having a diameter greater than that of the rest of the hole, and furnished with a tapping arrangement. Retaining head 48 has an external diameter larger than that of hole 62 and smaller than that of counterbore 82. Additionally, rod 58 comprises a head 84 whose external diameter is adjusted to match that of counterbore 82 and is furnished with a thread that is capable of cooperating with the tapping arrangement of counterbore 82. According to this variant, it is possible to adjust free play E by optionally placing one or more washers between the bottom of counterbore 82 and retaining head 48. According to this variant, free play E is not necessarily greater than or equal to the sum of the heights of holes 18, 18'. It might be smaller.

It is relatively simple to use this embodiment. After withdrawing head 16 of the fastener and drilling hole 38, the user inserts needle 50 in hole 62 in punch 60 and hole 38 that passes through the fastener. He then inserts rod 58 in needle 50 in such manner as to ensure that expandable head 46 is in the expanded state. If necessary, he may have interposed washers between retaining head 48 and punch 60. In order to keep this adjustment, he screws head 84 of rod 58 tight; with a screwdriver for example, head 84 having a contour that enables it to be rotated with the screwdriver. Then, the user strikes upper face 70 of punch 60, with a tool to expel the remainder of the fastener.

In this action, punch 60 expels the remainder of the fastener, which is held in place by expandable head 46 as shown in FIG. 5B. Then, the user withdraws rod 58. Expandable head 46 retracts so that it is able to be withdrawn from hole 38 and releases the needle from the remainder of the fastener. After this, the hole left by the fastener is plugged using expanding foam which hardens so as to strengthen to panel and immobilise the remainder of the fastener in the cellular structure in order to minimise vibrations.

While at least exemplary embodiment has been presented in the foregoing summary detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for destroying a blind fastener that joins two parts, said blind fastener comprising a body situated in holes provided in the two parts, with head at each end thereof, portions of which protrude above a level of the holes, said method comprising:
    withdrawing an accessible head of the blind fastener;
    creating a hole through the blind fastener;
    inserting a device that is configured to restrain a remainder of the blind fastener in the hole,
        wherein the device includes an elongated body having a diameter smaller than or equal to that of the hole and an expandable head at one end thereof,
        wherein the device is further configured for limited movement relative to the two parts; and
    expelling the remainder of the blind fastener from the holes.

2. The method according to claim 1, wherein the limited movement relative to the two parts is a substantial immobilization relative to the two parts.

3. The method according to claim 1, further comprising ensuring a free play between the blind fastener and the expandable head when positioning the device for holding the remainder of the blind fastener in place.

4. The method according to claim 1, wherein the expelling the remainder of the blind fastener from the holes comprises expelling the remainder of the blind fastener from the holes with a punch.

5. The method according to claim 4, further comprising using a bearing element that is braced against a reference element and supports the device for holding the remainder of the blind fastener in place such that the punch is slidable relative to the device for holding the remainder of the blind fastener in place.

6. The method according to claim 4, further comprising
providing a connection between the punch and the device for holding the remainder of the blind fastener in place;
immobilising the punch and the device relative to one another.

* * * * *